June 2, 1970  J. M. OBORNY  3,515,292
BALE LOADING DEVICE
Filed July 30, 1968  4 Sheets-Sheet 1
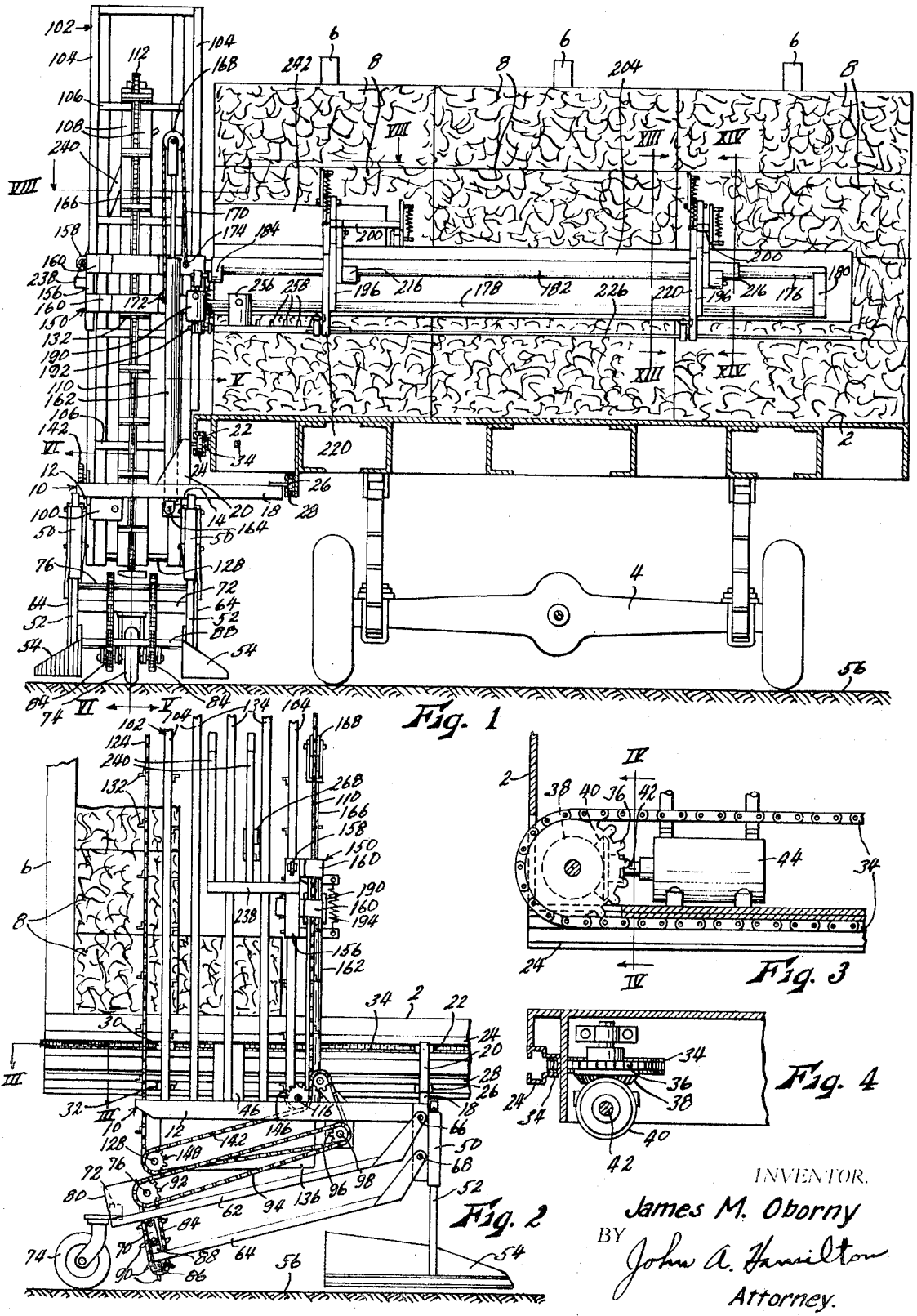
INVENTOR.
James M. Oborny
BY John A. Hamilton
Attorney.

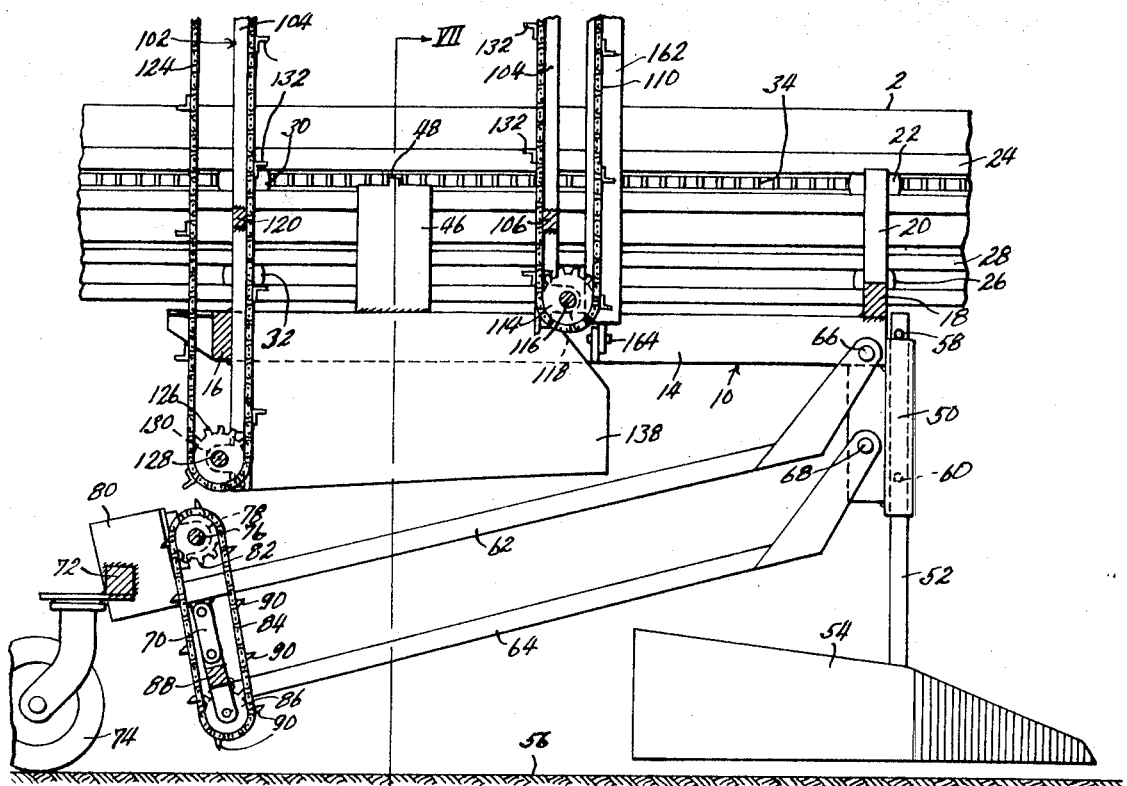

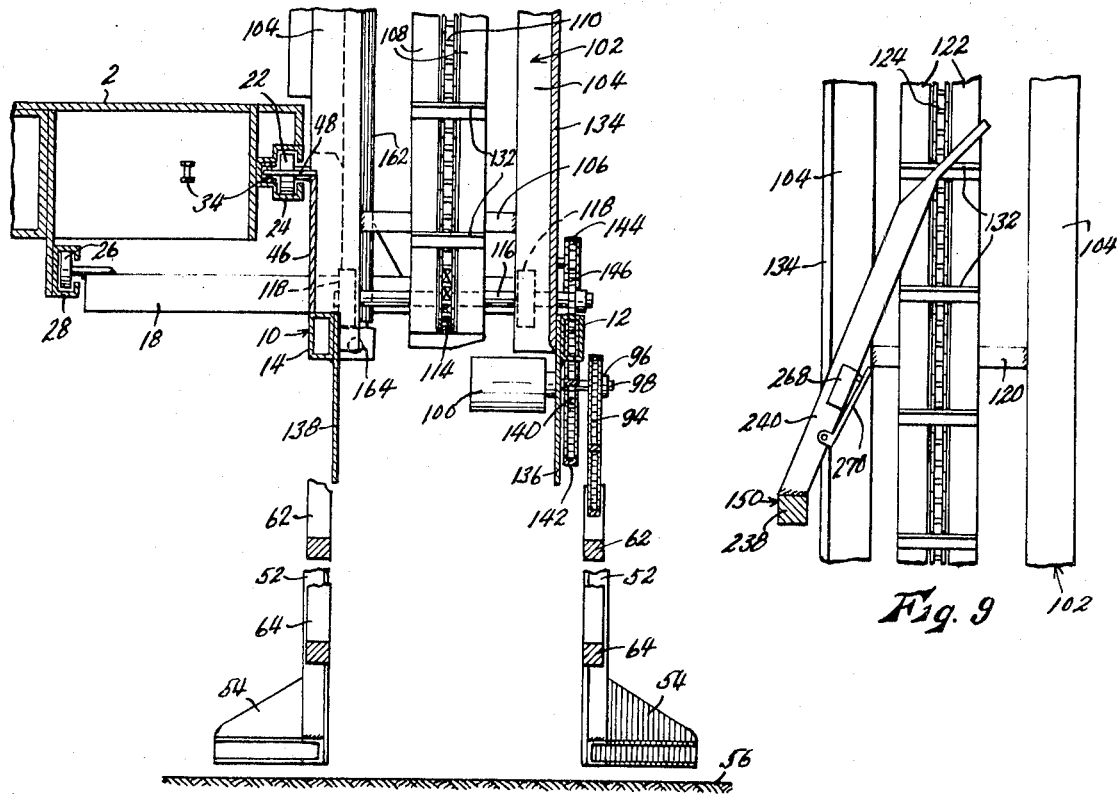
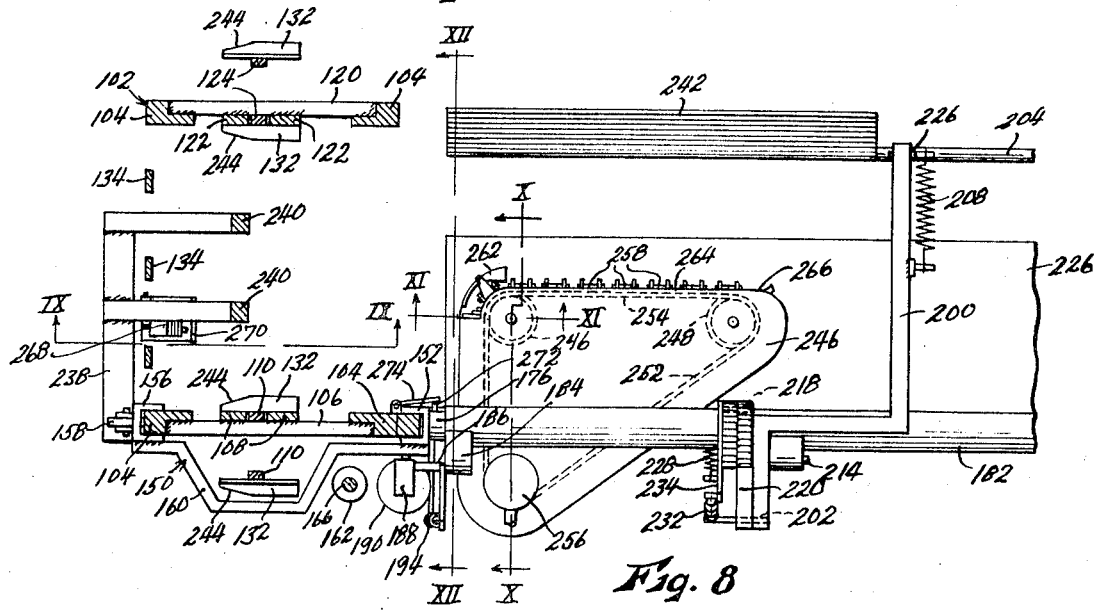

June 2, 1970 J. M. OBORNY 3,515,292
BALE LOADING DEVICE
Filed July 30, 1968 4 Sheets-Sheet 4
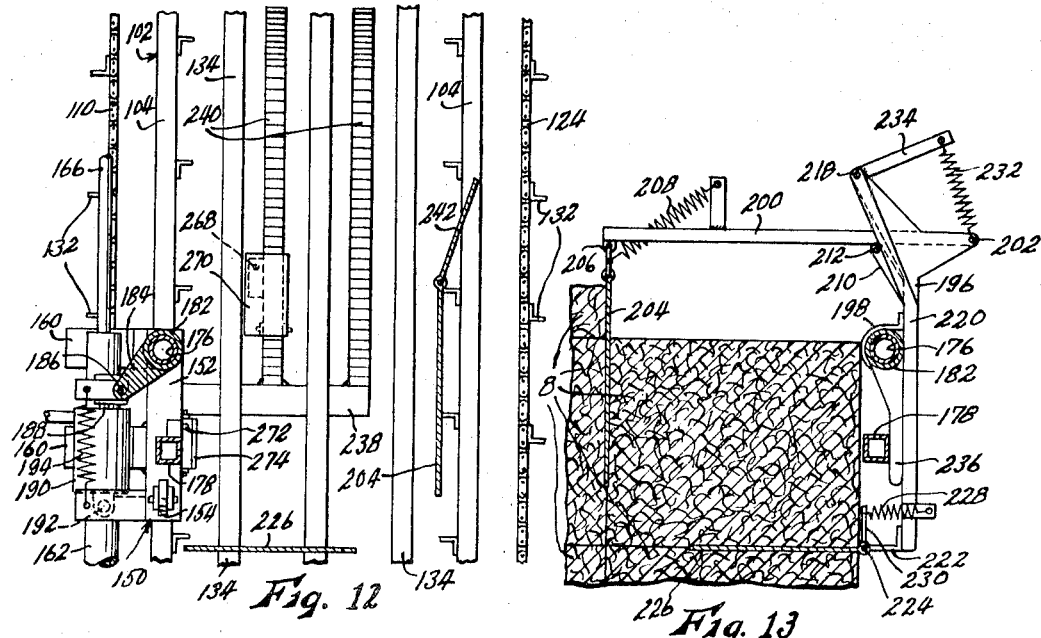
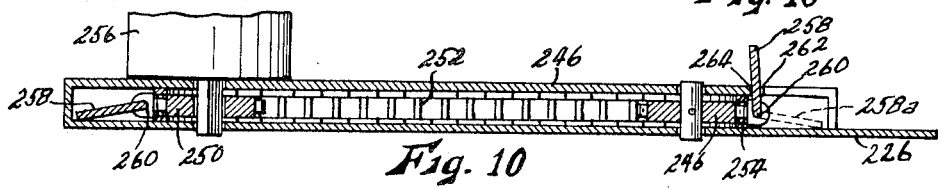
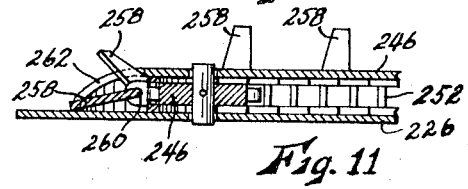
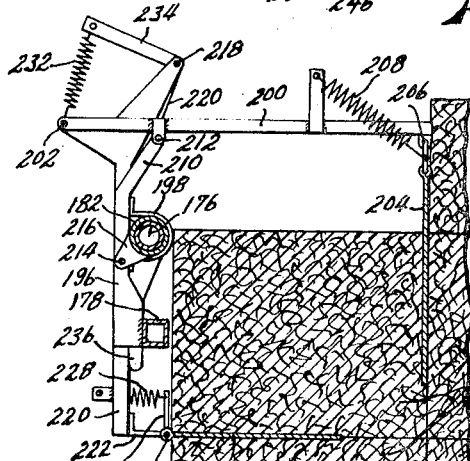
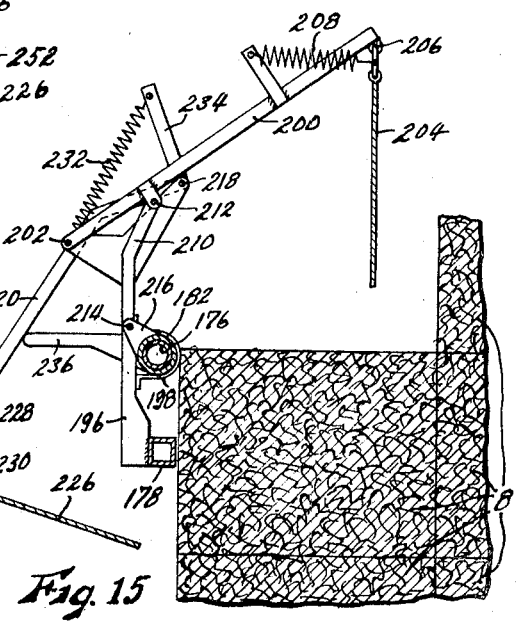
INVENTOR.
James M. Oborny
BY John A. Hamilton
Attorney.

United States Patent Office 3,515,292
Patented June 2, 1970

3,515,292
BALE LOADING DEVICE
James M. Oborny, Box 52, Durham, Kans. 67438
Filed July 30, 1968, Ser. No. 748,763
Int. Cl. B65g 57/32
U.S. Cl. 214—6                                     6 Claims

ABSTRACT OF THE DISCLOSURE

A bale loading device comprising a frame adapted to be mounted on a truck bed for forward and rearward movements along one of the side edges thereof, a pick-up device carried by said frame at ground level to pick up bales one at a time from the ground as said truck is driven forwardly, an elevator device carried by said frame to receive bales from said pick-up device and to convey them upwardly, a horizontal trough member carried by said elevator for vertical movement thereon and extending transversely across said truck bed, said trough including front and rear vertical walls and a horizontal bottom wall, means for ejecting bales from said elevator into said trough, means for conveying said bales along said trough to distribute them across the entire width of said truck bed, and means for withdrawing one of said vertical trough walls upwardly and withdrawing said bottom wall horizontally beneath the other of said vertical walls, whereby to deposit said bales on said truck bed, all of said operations being performed by power means operable from a remote station.

---

This invention relates to new and useful improvements in bale loading devices, being that class of device mountable on a truck or other conveyance and operable to pick up bales of hay or the like deposited on the ground in a field by a baling machine, and to place the bales on the bed of said conveyance for transportation and storage.

Various devices for this purpose have heretofore been offered, but all within my knowledge are only partially successful in that they perform only a portion of the operations involved. That is, while they do function to pick up the bales from the ground and to elevate them to a convenient position above the bed for handling by human operators standing on the bed, they do not stack the bales neatly in the final position desired on said bed, that is, in horizontal and vertical rows. This operation must, on the contrary, be performed by manual labor.

Accordingly, the principal object of the present invention is the provision of a bale loading device which will not only pick up the bales from the ground and elevate them above the truck bed, but will also stack said bales neatly and compactly in horizontal and vertical rows over the entire area of the truck bed, all without manual lifting or handling of the bales at any time. All operations of the device are powered by control means operated from a remote station, preferably convenient to the driver of the truck, so that he can perform the entire operation alone, without necessity of leaving the driver's seat.

My invention may be summarized as the provision of a frame adapted to be mounted on a truck bed at one side thereof for forward and rearward movement with respect to said bed, remotely controlled power means for moving said frame, a pick-up device carried by said frame substantially at ground level and powered to pick up bales one at a time from the ground as the pick-up device is moved thereover by driving the truck forwardly, an elevator structure carried by said frame and extending above the truck bed, and including powered means for receiving and elevating bales delivered thereto by said pick-up device, a horizontal bale-receiving trough carried for vertical movement by said elevator structure and extending laterally across said truck bed, said trough including front and rear vertical walls and a horizontal bottom wall, remotely controlled power means for moving said trough vertically with respect to said elevator structure, means for ejecting bales from said elevator structure into said trough at any elevation of the latter, powered means for propelling bales slidably through said trough away from said elevator structure until said trough is completely filled by a horizontal row of bales transverse to the truck bed, and powered means whereby one of said vertical trough walls is withdrawn upwardly and said horizontal bottom trough wall is withdrawn horizontally beneath the other of said vertical walls, whereby said horizontal transverse row of bales is deposited on the truck bed, or on top of a previously loaded row of bales. By moving the frame along the truck bed in steps corresponding to the horizontal width of a bale, and by moving the trough upwardly on the elevator structure in steps corresponding to the vertical thickness of a bale, the entire area of the truck bed may be covered closely with bales, and several horizontal courses of bales may be laid one over the other.

Other objects are simplicity and economy of construction, and efficiency and dependability of operation.

With these objects in view, as well as other objects which will appear in the course of the specification, reference will be had to the accompanying drawing, wherein:

FIG. 1 is a front elevational view of a bale loading device embodying the present invention, shown operatively mounted on the bed of a truck, and looking in a direction opposite to the direction of forward movement of the truck, FIG. 2 is a fragmentary left side view of the parts as shown in FIG. 1, with parts omitted, FIG. 3 is an enlarged fragmentary sectional view taken on line III—III of FIG. 2, FIG. 4 is a fragmentary sectional view taken on line IV—IV of FIG. 3, FIG. 5 is an enlarged, fragmentary sectional view taken on line V—V of FIG. 1, FIG. 6 is an enlarged, fragmentary sectional view taken on line VI—VI of FIG. 1, FIG. 7 is a fragmentary sectional view taken on line VII—VII of FIG. 5, FIG. 8 is an enlarged, fragmentary sectional view taken on line VIII—VIII of FIG. 1, FIG. 9 is a fragmentary sectional view on line IX—IX of FIG. 8, FIG. 10 is an enlarged, fragmentary sectional view taken on line X—X of FIG. 8, FIG. 11 is an enlarged, fragmentary sectional view taken on line XI—XI of FIG. 8, FIG. 12 is a fragmentary sectional view taken on line XII—XII of FIG. 8, FIG. 13 is an enlarged, fragmentary sectional view taken on line XIII—XIII of FIG. 1, with a bale disposed in the trough, FIG. 14 is an enlarged, fragmentary sectional view taken on line XIV—XIV of FIG. 1, with a bale disposed in the trough, and FIG. 15 is a view similar to FIG. 14, but with the movable walls of the trough withdrawn to release the bale.

Like reference numerals apply to similar parts throughout the several views, and the numeral 2 applies to the bed of a truck to be loaded with bales of hay, said bed being generally horizontal and planar, and supported by the usual wheeled chassis 4, as indicated in FIG. 1, in which the bed is shown in section looking in a direction toward the rear of the bed. Along the rear of said bed there are affixed a series of upstanding posts 6, extending to a height at least as great as that to which the bales are to be stacked. The bales are indicated at 8, it being understood that each bale is generally rectilinear in form, dimensions of 14 x 8 x 40 inches being perhaps average.

Spaced just outwardly from one side of bed 2, and below the level thereof, is a frame indicated generally by the numeral 10, and including a pair of side rails 12 and 14 extending horizontally from front to rear of the truck bed, and spaced apart transversely thereof. Said side rails are rigidly joined at their rearward ends by a cross bar 16 (see FIGS. 5 and 6), and at their forward ends by cross bar 18. Affixed to cross bar 18 is an upstanding post 20 at the upper end of which a roller 22 is mounted for rotation on a horizontal transverse axis, said roller being engaged in a C-shaped channel 24 extending along the entire length of the adjacent edge of the truck bed and affixed thereto. Frame cross bar 18 extends transversely beneath the truck bed, and has a roller 26 mounted at the inner end thereof for rotation on a horizontal transverse axis, and engaged in a C-shaped channel 28 affixed to the truck bed parallel with channel 24. Similarly, frame 10 is supported at its rearward end by rollers 30 and 32 (see FIGS. 2 and 5) also engaged respectively in channels 24 and 28.

Rollers 22, 24, 30 and 32 thus support frame 10 for forward and rearward rolling movement along one side of truck bed 2, and said frame is moved by means of an endless sprocket chain 34 trained about a sprocket wheel 36 (see FIGS. 3 and 4) at the rearward end of the bed, and about a similar sprocket wheel (not shown) at the forward end of the bed. Sprocket wheel 36 has affixed thereto a bevel gear 38 meshed with a bevel gear 40 fixed on the output shaft 42 of a hydraulic motor 44 mounted on the truck bed. Said motor is reversible, preferably by controls convenient to the driver of the truck, whereby chain 34 may be driven selectively in either direction. One reach of chain 34 moves slidably through the base portion of channel 24, so as not to interfere with rollers 22 and 30 engaged in said channel. A plate 46 affixed to frame side rail 14 (see FIGS. 5 and 7) is provided with a finger 48 which extends horizontally into channel 24 and engages between a pair of adjacent pins of chain 34, whereby movement of said chain moves said frame forwardly or rearwardly, as may be desired.

A vertical sleeve 50 is affixed to the forward end of each frame side rail 12 and 14, and depends therefrom. Slidably mounted in each of said sleeves is a vertical post 52 to the lower end of which is affixed a vertical guide plate 54. Plates 54 extend rearwardly in parallel relation from posts 52, while the portions of said plates extending forwardly of said posts are angled to be forwardly divergent. Plates 54 are normally supported just above the ground level 56 by a pin 58 inserted transversely through each post 52 and bearing against the upper end of the associated sleeve (see FIGS. 5 and 6). When the bale loader is not in use, posts 52 may be elevated in the sleeves and pins 58 inserted through holes 60 of the posts, to retain plates 54 well above the ground. Thus, as the truck is moved forwardly, a bale 8 resting on the ground on one of its narrower longitudinal edges may enter between plates 54, and be guided rearwardly by the parallel portions of said plates.

A bale pick-up device includes a pair of over-and-under bars 62 and 64 disposed beneath and at each side of frame 10. Said bars are pivoted at their forward ends to sleeve structures 50 by pivots 66 and 68 respectively, so as to be movable vertically. The bars 62 and 64 each side of the frame are connected adjacent their rearward ends by vertically extending pivoted links 70, so as not to interfere with the vertical movement of the bars. Bars 62 are rigidly interconnected at their rearward ends by a horizontal cross bar 72, on which is mounted a ground-engaging caster wheel 74, whereby bars 62 and 64 are supported at their rearward ends.

Just forwardly of caster wheel 74, a shaft 76 extends horizontally and transversely, being journalled in bearings 78 (FIGS. 5 and 6) affixed to plates 80 mounted on bars 62. Fixed on said shaft are a pair of sprockets 82 spaced evenly between bars 62. A sprocket chain 84 is trained over each of said sprockets, eache chain also being trained about a sprocket 86 rotatably mounted on a horizontal cross bar 88 extending transversely between the rearward ends of bars 64. Each chain 84 has a series of outwardly-projecting teeth 90 secured thereto at spaced intervals therealong. A sprocket wheel 92 is affixed to shaft 76 at the outer side of the frame, said sprocket wheel being interconnected by sprocket chain 94 with a sprocket wheel 96 mounted on the output shaft 98 of a hydraulic motor 100 mounted on frame 10 adjacent the forward end thereof. It will be understood that motor 100, also preferably controlled by means convenient to the driver of the truck, turns in a direction to cause upward movement of the forward reaches of chains 84. Thus, as the truck is moved forwardly and a bale 8 enters between guide plates 54, said bale is further guided toward chains 84 by its inclusion between bars 62 and 64, and when the forward reaches of chains 84 engage the bale, the teeth 90 of said chains engage and elevate the rearward end of said bale. When the bale loader is not in use, the rearward end of the pick-up frame including bars 62 and 64 may be lifted well above the ground and secured to frame 10 by any suitable means, not shown.

Frame 10 also carries bale elevating means including a vertical elevator shaft indicated generally by the numeral 102 and defined by four vertical corner posts 104, whereby to form a hollow shaft of rectangular cross-sectional contour. The two corner posts closest to truck bed 2 are affixed at their lower ends to side rail 14 of frame 10, and the two outer corner posts are affixed at their lower ends to side rail 12 of frame 10. The two outer corner posts are affixed at their lower ends to side rail 12 of frame 10. The two rearward corner posts extend somewhat below said side rails of frame 10. Elevator shaft 102 extends above truck bed 2. The two forward corner posts are rigidly interconnected at intervals in their height by cross bars 106, and a pair of vertically extending slats 108 are rigidly affixed to said cross-bars intermediate the sides of the shaft, said slats extending from about the level of frame 10 to a point adjacent the top of the shaft. Said slats are spaced apart from each other, and a vertical reach of a sprocket chain 110 passes vertically therebetween, the other vertical reach of the chain being disposed exteriorly of the elevator shaft. Said chain is trained at the upper end of the loop formed thereby about a sprocket wheel 112 at the upper end of slats 108 (FIG. 1), and trained at the lower end of its loop about a sprocket wheel 114 at the lower end of said slats (FIGS. 5 and 6) said sprocket wheel being fixed on an axle 116 journalled in bearings 118 affixed to front corner posts 104. Similarly, rear corner posts 104 are rigidly interconnected by cross bars 120 having spaced apart vertical slats 122 having a vertical reach of a sprocket chain 124 disposed therebetween, the loop formed by chain 124 being trained at its upper end about a sprocket wheel, not shown, similar to sprocket wheel 112, and at its lower end about a sprocket wheel 126 (FIGS. 5 and 6) mounted on a horizontal transverse axle 128 journalled in bearings 130 fixed to slats 122 or rear corner posts 104 somewhat below the level of frame 10, and just above the normal elevation of chains 84 of the pick-up structure. Each of chains 110 and 124 has a series of horizontally elongated cleats 132 affixed thereto at regularly spaced intervals, and extending outwardly from the chain loop. The cleats occupying the inner reaches of the chains move slidable in an upward direction along the inner faces of slats 108 and 122 respectively. The outer side wall of elevator shaft 102 is formed by a series of spaced apart, vertically extending slats 134 fixed at their lower ends to frame side rail 12. A downward continuation of said wall is formed by a vertical plate 136 fixed at its upper edge to rail 12, and depending therebeneath. The inner side of the elevator shaft, being that side toward truck bed 2, is completely open and unobstructed except for a plate 138 fixed at its upper edge to frame side rail 14 and depending therebelow in corresponding relation to plate 136.

Elevator chains 110 and 124 are driven so that their inner or confronting reaches move upwardly at equal speeds by means of hydraulic motor 100. A sprocket wheel 140 on the drive shaft of said motor (see FIG. 7) has a sprocket chain 142 trained thereabout, said chain also being trained about an idler sprocket 144 carried rotatably by frame side rail 12, about a sprocket 146 fixed on the outer end of shaft 116, and about a sprocket 148 fixed on the outer end of shaft 128. Thus when the truck is driven forwardly to cause a bale 8 to enter between guide plates 54, and the rearward end of said bale is engaged and raised by teeth 90 of chains 84, both as previously described, the end of the bale being raised is guided upwardly between plates 136 and 138, and enters between the confronting reaches of chains 110 and 124, so that said bale is engaged and elevated by cleats 132 of said chains, moving upwardly through elevator shaft 102.

A carriage indicated generally by the numeral 150 is carried for vertical movement by the two front corner posts 104 of elevator shaft 102. Said carriage includes a vertical channel 152 fitted over the inner front corner post and having a roller 154 (FIG. 12) in rolling engagement with said corner post, a vertical channel 156 fitted over the outer front corner post and having a roller 158 in rolling engagement with said corner post, and a pair of transverse cross bars 160 rigidly interconnecting said channels. As best shown in FIG. 8, said cross bars are offset forwardly to bridge the downwardly moving outer reach of elevator chain 110, and the cleats 132 carried thereby. Carriage 150 is raised and lowered by means of a hydraulic cylinder 162 pivoted at its lower end to frame rail 14, as at 164, and having its piston rod 166 extending upwardly with a pulley 168 rotatably mounted at its upper end, as best shown in FIG. 1, a cable 170 trained over said pulley has one end thereof fixed to the cylinder, as at 172, and the other end thereof fixed to upper cross bar 160 of carriage 150, as at 174. Thus, as piston rod 166 is extended, carriage 150 is elevated, and as said piston rod is retracted, the carriage is lowered, the movement of the carriage being twice that of the piston rod. Cylinder 162 is controlled by control means preferably convenient to the driver of the truck.

Carriage 150 also includes a cylindrical beam 176 fixed at one end to channel 152 of the carriage and extending horizontally and transversely across truck bed 2, and a square beam 178 also secured at one end to channel 152, and extending beneath and parallel to beam 176. Beams 176 and 178 are rigidly interconnected at their free ends by a vertical strut 180 (see FIG. 1). A cylindrical sleeve 182 is telescoped over beam 176, extending the major portion of the length of said beam, and is axially rotatably thereon. At the end thereof adjacent carriage 150, sleeve 182 is provided with a radially extending crank 184, said crank being pivoted at its outer end, as at 186, to the upper free end of the piston rod 188 of a hydraulic cylinder 190 which is pivoted at its lower end, as at 192, to carriage 150. Thus as piston rod 188 is extended upwardly by hydraulic pressure, sleeve 182 is rotated in a clockwise direction, as viewed in FIG. 12. When fluid is exhausted from cylinder 190, the piston rod is retracted, and sleeve 182 turned in a counter-clockwise direction, by a tension spring 194 interconnecting crank 184 and carriage 150. Cylinder 190 is preferably controlled by means convenient to the driver of the truck.

A plurality of vertical posts 196 (two shown) are affixed at their lower ends to beam 178 at spaced points along the length thereof, and extend upwardly above beam 176, past the forward edge of sleeve 182. Each post has a band 198 affixed thereto and encircling sleeve 182, whereby to support the post and still permit rotation of said sleeve. An arm 200 is pivoted to the upper end of each post 196, as at 202 (see FIGS. 13–15) and extends rearwardly over sleeve 182 to a distance generally equal to the front-to-rear width of a bale 8. Pivotally depending from the rearward ends of arms 200 is a generally vertical slide plate 204, said plate extending substantially the full length of beams 176 and 178 and being pivoted to arms 200 by members 206. A tension spring 208 interconnecting member 206 with arm 200 serves to incline plate 204 slightly forwardly of vertical when arm 200 is horizontal, and when no bale is disposed against the forward face of said plate. A link 210 is pivoted, as at 212, to arm 200 rearwardly of pivot 202, and extends downwardly by the forward side of sleeve 182, being pivoted at its lower end, as at 214 to a radially extending crank 216 fixed to sleeve 182. Thus when sleeve 182 is turned in a clockwise direction, as viewed in FIG. 14, link 210 pivots arm 200 from the horizontal position shown in FIG. 14 to the upwardly and rearwardly inclined position shown in FIG. 15, raising plate 204 as shown.

Also pivoted to the upper end of each post 196, as at 218, is an arm 220 which depends past the forward side of sleeve 182 to a point below beam 178, and which has a rearwardly extending bracket 222. Pivoted to the rearward ends of said brackets, as at 224, is a generally horizontal slide plate 226. Said slide plate pivots vertically on a horizontal transverse axis, extends laterally of the truck bed to the same extent as vertical slide plate 204, and underlies the front-to-rear space between sleeve 182 and plate 204. A tension spring 228 interconnecting arm 220 with an upstanding standard 230 fixed to the forward edge of plate 226 serves to incline said plate slightly upwardly to the rear when arm 220 is vertical, and when said plate is not supporting a bale. A tension spring 232 interconnecting post 196 with a bracket 234 fixed to arm 220 serves normally to hold arm 220 rearwardly against sleeve 182. A lever 236 is fixed to sleeve 182 in alignment with each arm 220, and normally extends downwardly just to the rear of said arm, as shown in FIG. 13. When sleeve 182 is turned in a clockwise direction as viewed in FIG. 14, the lower end of lever 236 moves slidably up the rearward side of arm 220, pivoting said arm forwardly as shown in FIG. 15, and withdrawing plate 226 forwardly beneath beam 178. When sleeve 182 is then turned in a counter-clockwise direction, arm 220 is returned to its normal position by spring 232.

It will thus be seen that with slide plates 204 and 226 in their normal positions as shown in FIGS. 13 and 14, they form an open-topped trough extending laterally above truck bed 2, beams 176 and 178 constituting in skeleton form the fixed forward wall of said trough, plate 204 forming the rear wall, and plate 226 forming the bottom wall. Each hay bale 8, as it is raised through elevator shaft 102 by chains 110 and 124 and cleats 132 as previously described, is deflected from said elevator shaft and tipped into said trough by means including an elongated base arm 238 fixed at one end to channel 256 of carriage 150 and extending rearwardly adjacent the outer side wall of said elevator shaft formed by slats 134, and a pair of deflector arms 240 fixed at their lower ends to arm 238 and inclined upwardly and inwardly into the elevator shaft, between slats 134. Said deflector arms engage and push each bale outwardly through the open inner side of the elevator shaft, as said bale is elevated by chains 110 and 124, tilting the bale so that its upper end falls into the trough including plates 204 and 226. Plate 204, immediately adjacent the elevator shaft, is provided with an upwardly and rearwardly inclined baffle plate 242 (see FIGS. 8 and 12), to insure that the bale will be guided accurately into the trough. The arm 220 supporting plate 204 which is closest to the elevator shaft may be horizontally offset away from said shaft, as best shown in FIG. 8, to insure that it will not be struck by a bale falling into the trough. Also, as best shown in FIG. 8, cleats 132 of chains 110 and 124 may be bevelled as indicated at 244 to facilitate dislodgement of the bales therefrom by deflector arms 240.

Once each bale 8 is deposited into the trough adjacent the elevator shaft as described above, it is propelled through the trough away from the elevator shaft by means carried by plate 226 adjacent the shaft, and best shown in FIGS. 8, 10 and 11. Said means includes a generally triangular plate 246 disposed above and parallel to plate 226 to form a vertically narrow housing therebetween. Three sprocket wheels 246, 248 and 250 are mounted rotatably in said housing on vertical axes in a generally triangular pattern, and a sprocket chain 252 is trained about said sprockets, the reach 254 of said chain extending between sprockets 246 and 248 being longitudinal of the trough and about midway between the forward and rearward sides of said trough, while sprocket 250 is disposed forwardly of beams 176 and 178 which defines the forward wall of the trough. Sprocket 250 is driven by a hydraulic motor 256 mounted on plate 246, whereby chain 252 is driven in such a direction that reach 254 thereof moves away from elevator shaft 102. A series of elongated teeth 258 are carried by chain 252 at spaced intervals therealong. Each tooth is pivoted to the chain, as at 260, on an axis parallel to the chain axis, so that it can pivot downwardly to rest on plate 226, as shown in dotted lines at 258a in FIG. 10, or can be pivoted upwardly as shown in solid lines to project above plate 246. As the chain enters reach 254, a cam 262 mounted on plate 226 engages and pivots each tooth to its raised position, wherein it is inclined slightly forwardly of vertical to rest slidably on the adjacent edge 264 of plate 246, as best shown in FIG. 10, so that said fingers remain elevated even after passing the cam. At the opposite or outer end of chain reach 254, plate 246 forms a cam 266 which pivots the fingers to their lowered positions.

Hydraulc motor 256 is controlled by means including a first electric switch 268 mounted on one of deflector arms 240 and operable to be closed by pressure against a lever 270 pivoted to said deflector arm by a bale rising through said elevator shaft, and by a second electric switch 272 mounted on trough beam 178 adjacent carriage 150 and operable to be closed by a lever 274 pivoted to said carriage, by the presence of a bale in the trough including plates 204 and 226, in alignment with and engaging said lever. While the controls of motor 256 are not shown in detail, it will be understood that fluid under pressure is supplied to said motor by an electrically operable valve, the operating electric circuit of said valve including switches 268 and 272 in parallel, so that said motor is set in operation whenever either of said switches is closed.

In the operation of the loader, it will be seen that the trough formed by beams 176 and 178, and plates 204 and 226, is capable of holding three bales 8 in end-to-end relation, these bales constituting one entire transverse horizontal row of bales to be stacked on the truck bed 2. Accordingly, frame 10 is first moved forwardly or rearwardly by operation of hydraulic motor 44, and carriage 150 is moved vertically on elevator shaft 102 by operation of hydraulic cylinder 162, both as previously described, until said trough is disposed to contain said three bales substantially exactly in the position in which it is desired to deposit them, whether this position is directly on truck bed 2, or on top of a row previously deposited. The action of springs 208 in holding slide plate 204 to be inclined somewhat to the front, and of springs 228 to hold slide plate 226 to be inclined slightly upwardly to the rear, facilitates movement of the trough into the desired position, in that it tends to eliminate interference between said plates and bales already deposited, although said plates are readily moved to their respective vertical and horizontal positions, as shown in FIGS. 13 and 14, by the weight of bales deposited therein. The trough is arranged to load the truck bed first at its rearward end, then forwardly, row by row. Motor 44 may be provided with automatic controls set to move frame 10 forwardly in steps corresponding to the front-to-rear width of a bale, and cylinder 162 may be provided with automatic controls set to move carriage 150, and hence the "trough," upwardly in steps corresponding to the vertical thickness of a bale, but these automatic controls are standard and are not illustrated.

Then the truck is driven forwardly as previously described to cause bales lying on the ground to enter successively between guides 54 till the rearward end of each bale is picked by teeth 90 of chains 84 and introduced between cleats 132 of chains 110 and 124, and the bales are elevated through elevator shaft 102 by said cleats, also as previously described. As each bale engages deflector arms 240, it engages and pivots lever 270 to close switch 268, and hydraulic motor 256 is thereby set in operation to start chain 252 in movement. Thus when the bale is dislodged from cleats 132 by deflector arms 240 and falls into the trough, it is engaged by teeth 258 of said chain, which have been raised by cam 262, and thereby is moved outwardly through the trough. When said bale falls into the trough, it also pivots lever 274 to close switch 272, thereby maintaining motor 256 in operation to move the bale completely into the chute, or until said bale clears lever 274 to allow switch 272 to open. If another bale is immediately following the first, or whenever the next bale is picked up, said following bale first closes switch 268 to continue or restart motor 256 in operation, thereby causing the first bale to move outwardly in the trough to clear the entry end of the trough before the second bale falls into the trough. Thus no following bale can fall on top of a bale already in the trough. The driving reach 254 of chain 252 extends along only a short portion of the trough at the entry end thereof, and hence cannot move a single bale all the way to the outer end of the trough. However, the last bale deposited is always driven by said chain, and pushes any previously deposited bales ahead of it. This action is continued until the trough is completely filled and the last bale deposited has cleared lever 274 to allow switch 272 to open, thereby causing motor 256 to cease operation. It should be noted that slide plates 204 and 226 are never required of themselves to support any substantial pressure from the bales. Plate 204 is supported from th rear by truck bed posts 6 when the rearmost row of any layer of bales is being deposited, and by previously deposited rows of bales when depositing any row of bales forward from said rearmost row, and plate 226 is supported from below by truck bed 2 when depositing the lowermost row of any vertical tier of rows, and by previously deposited rows of bales when depositing any higher row. Plates 204 and 226 act primarily as slides permitting movement of bales along the trough. Thus said plates may be of thin, light weight material, or even flexible.

When the trough has been completely filled as described above, the operator actuates hydraulic cylinder 190 to rotate sleeve 182 of beam 176 in a clockwise direction as viewed in FIGS. 12, 14 and 15, thereby as previously described elevating plate 204 from behind the bales then in the trough, and withdrawing plate 226 forwardly from beneath the bales in the trough, as shown in FIG. 15. The bales formerly in the trough are thus deposited on the truck bed in precisely the position desired. Forward movement of the bales with plate 226 is prevented by the engagement of the forward faces of said bales with sleeve 182 of beam 176, and with beam 178. Teeth 258 of chain 252 are also engaged at this time in the bale in the trough at the entry end thereof, but they do not prevent forward movement of plate 226, since they pivot freely to the rear to lie against plate 226, as shown in dotted lines in FIG. 10.

After each transverse horizontal row of bales has been deposited as described, hydraulic motor 44 and/or cylinder 162 are operated to move the trough into position to deposit the next row, fluid is exhausted from cylinder 190 whereupon spring 194 turns sleeve 182 in a clockwise direction to return plates 204 and 226 to their normal position to reform the trough, and the process is repeated. In this manner the entire area of the truck bed may be covered with bales neatly and compactly stacked in horizontal rows, to a depth limited only by the height of elevator shaft 102, without necessity of manual handling of the bales at any point in the process. By making truck bed 2 tiltable on chassis 4 to a vertical position with its rearward edge substantially at ground level, and providing means for withdrawing bed posts 6 forwardly from beneath the stack of bales, the entire mass of bales on the truck bed can be transferred as a unit from the truck bed to the ground, also without manual handling of the bales. However, this added feature is not intrinsically a part of the present invention, and is not illustrated.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A bale loading device for use in combination with a truck having a generally planar, horizontal bed, said device comprising:
   (a) a generally rectangular, elongated trough extending horizontally across said bed, said trough including a fixed, longitudinally extending side wall, a movable longitudinally extending side wall, and a movable longitudinally extending bottom wall, said movable walls being structurally supported by said fixed wall,
   (b) means mounting said trough on said bed whereby said trough may be moved, vertically and horizontally in a direction transverse to its longitudinal extent, with respect to said truck bed,
   (c) means carried by said truck for depositing bales in said trough, and
   (d) means for opening said trough to permit downward and lateral escape of said bales therefrom, said trough opening means comprising means carried by said fixed wall and operable both to elevate said movable side wall, and also to withdraw said bottom beneath said fixed wall transversely of said trough.

2. A bale loading device as recited in claim 1 wherein said movable trough walls are supported from said fixed trough wall by means comprising:
   (a) a post affixed to said fixed wall and extending thereabove,
   (b) a first arm pivoted to the upper end of said post on an axis longitudinal to said trough and extending transversely over said trough, said movable side wall being suspended from the free end of said first arm, and
   (c) a second arm pivoted to the upper end of said post on an axis longitudinal to said trough and depending below said fixed wall exteriorly of said trough, said movable bottom wall being attached at its adjacent longitudinal edge to the lower end of said second arm, and wherein said trough opening means comprises means carried by said fixed wall and operable to simultaneously pivot said first arm upwardly and said second arm outwardly.

3. A bale loading device as recited in claim 2 wherein said movable trough walls are each pivoted to their respective supporting arms for pivotal movement on axes longitudinal to said trough, and with the addition of resilient means interconnecting each of said movable walls with its supporting arm whereby said movable side wall is normally but yieldably maintained at an inclination to slope inwardly and downwardly into the trough zone, and said movable bottom wall is normally but yieldably maintained at an inclination to slope upwardly into the trough zone transversely thereof.

4. A bale loading device for use in combination with a truck having a generally planer, horizontal bed, said device comprising:
   (a) a generally rectangular, elongated trough extending horizontally across said bed,
   (b) means mounting said trough on said bed whereby said trough may be moved vertically, and horizontally in a direction transverse to its longitudinal extent, with respect to said truck bed,
   (c) means carried by said truck bed for depositing bales in said trough, said trough mounting and bale depositing means comprising a frame carried by said truck bed at one edge thereof for horizontal movement longitudinally of said edge, a hollow elevator shaft carried by said frame in outwardly spaced relation from said truck bed edge and extending above said truck bed, powered elevating means carried by said elevator shaft and operable to elevate bales entering the lower end of shaft upwardly through said shaft, bale pick-up means carried by said frame at the lower end of said elevator shaft and operable to pick up bales one at a time from the ground as said pick-up device is moved into operative relationship to said bales by movement of said truck over the ground, a carriage mounted for vertical movement on said elevator shaft, said trough being mounted on said carriage, powered means carried by said frame for moving said carriage upwardly and downwardly on said elevator shaft, and deflector means mounted on said carriage and operable to deflect each bale rising through said elevator shaft laterally into said trough at the adjoining end thereof, and
   (d) means for opening said trough to permit downward and lateral escape of said bales therefrom.

5. A bale loading device as recited in claim 4 with the addition of powered means carried by said trough and operable to propel bales entering said trough toward the opposite end thereof, said propelling means being positioned to engage only a single bale at the entry end of said trough, whereby said single bale pushes ahead of it any bales previously deposited in the trough, said propelling means being operable to be activated by contact of a bale with either of two control members, the first of said control members being carried by said carriage to be engaged by a bale rising through said elevator shaft, before said bale enters said trough, and the second of said control members being carried by said trough to be engaged by a bale entering said trough from said elevator shaft, and to be disengaged by said bale after said bale has moved completely into said trough.

6. A bale loading device as recited in claim 5 wherein said trough includes a horizontally movable bottom wall, and said trough opening means includes powered means for moving said bottom wall horizontally in a direction transverse to said trough, and wherein said bale propelling means comprises:
   (a) a vertically narrow housing carried by said bottom wall in generally coplanar relationship therewith adjacent the entry end of the trough,
   (b) a sprocket chain trained about sprockets in said housing, said chain moving in a plane parallel to said bottom wall and having one reach thereof extending longitudinally of the trough above said bottom wall, (c) powered means carried by said bottom wall for driving said chain in such a direction that said one reach thereof moves in a direction away from the entry end of said trough, (d) a series of teeth pivoted to said chain on axes parallel to the extent of the chain to be movable from a raised position projecting upwardly from said bottom wall to a lowered position lying substantially against said bottom wall, the direction of pivotal movement of said teeth on said one reach of said chain toward their lowered positions being opposite to the lateral movement of said bottom plate in the opening of said trough, (e) cam means carried by said bottom plate to pivot each tooth to its raised position as it enters said one chain reach, and (f) cam means carried by said bottom wall to pivot each tooth to its lowered position as it leaves said one chain reach.

References Cited

UNITED STATES PATENTS

| | | |
|---|---|---|
| 2,585,891 | 2/1952 | Worsdell _____ 214—42 |
| 2,977,002 | 3/1961 | Asp. |
| 3,126,105 | 3/1964 | Marguet. |
| 3,381,828 | 5/1968 | Sheehan. |
| 3,385,456 | 5/1968 | Snider. |
| 3,400,839 | 9/1968 | Jay et al. |
| 3,400,840 | 9/1968 | Fischer. |
| 3,416,674 | 12/1968 | Gualandris et al. |

OTHER REFERENCES

German printed application, No. 1,218,948, June 6, 1966.

GERALD M. FORLENZA, Primary Examiner

R. J. SPAR, Assistant Examiner

U.S. Cl. X.R.

214—520; 198—7